G. SCHWABACH.
ROTARY APPARATUS FOR REMOVING MATERIAL TO BE DUMPED FROM FURNACES.
APPLICATION FILED SEPT. 2, 1921.
1,427,026. Patented Aug. 22, 1922.
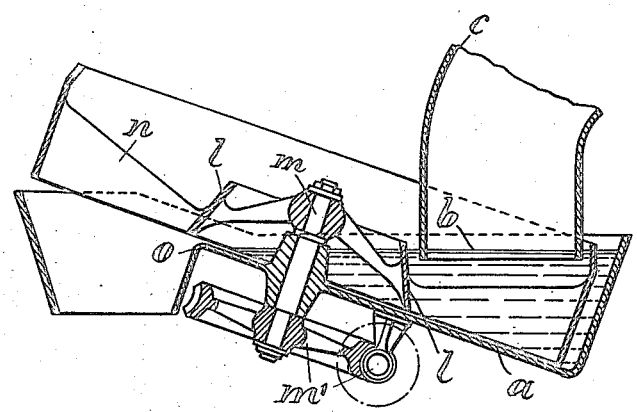
Inventor:
Georg Schwabach

UNITED STATES PATENT OFFICE.

GEORG SCHWABACH, OF CHARLOTTENBURG, NEAR BERLIN, GERMANY.

ROTARY APPARATUS FOR REMOVING MATERIAL TO BE DUMPED FROM FURNACES.

1,427,026.

Specification of Letters Patent. Patented Aug. 22, 1922.

Original application filed October 7, 1916, Serial No. 124,405. Divided and this application filed September 2, 1921. Serial No. 498,039.

*To all whom it may concern:*

Be it known that I, GEORG SCHWABACH, a citizen of the Republic of Germany, and residing at Charlottenburg, near Berlin, Germany, have invented certain new and useful Improvements in Rotary Apparatus for Removing Material to be Dumped from Furnaces (for which I have filed applications in Germany, February 11, 1915, No. Sch. 48,294V/24G, and May 28, 1915, No. Sch. 48,656V/24G, and May 29, 1915, No. Sch. 48,661V/24G), of which the following is a specification.

This invention relates to apparatus for removing material to be dumped, particularly hot ashes, clinker, coke, dust and the like from furnace installations, boiler plants, coke-ovens, refuse destructors, feed heaters and like plants.

In the parent application, Serial No. 124,405, filed October 7, 1916, Patent No. 1,399,663, December 6, 1921, from which this has been divided out, some forms of the invention are described which are particularly adapted for continuously conveying away large quantities of quenched material in a long tank or channel to a place remote from the discharge pipe.

A primary object of this invention is to provide rotary conveying apparatus particularly adapted for use in connection with small plants, in which the quenched material is to be removed directly at the place where it falls into the tank. To this end I arrange in the tank directly at the mouth of the discharge pipe for the material a conveyor wheel placed slantwise relatively to the surface of the water in the tank.

The invention consists in the construction, arrangement and combination of parts described hereinafter and pointed out in the claims.

One embodiment is represented by way of example in vertical sectional elevation in the accompanying drawing.

Referring to the drawing, the surface of the water in the tank $a$ is designated $b$ and the discharge pipe $c$. The material is removed from the tank by a blade wheel or rotary scraper $l$ which can be rotated about a slanting axle $m$ by means of gearing $m^1$ or the like. The wheel or rotary scraper $l$ comprises scrapers or blades $n$ arranged at intervals which push the material up the slanting bottom of the tank $a$ until it falls over the edge $o$ of the tank located above the level $b$ of the water, whereupon it is conveyed away by suitable transport devices such as tilting wagons, conveyor belts or the like, not shown. The blade wheel or rotary scraper $l$ need not necessarily work directly on the bottom of the tank $a$. If desired, the axle $m$ of the wheel may be so arranged that a small clearance space is left between the wheel $l$ and the bottom of the tank.

The described apparatus is particularly suitable for removing the material from the water close to where it enters, or when the material is discharged through only one pipe.

An important feature of the apparatus is that it comprises no immersed joints, pivots or other delicate parts subjected to excessive wear and tear.

It may be mentioned, in addition, that any water removed with the wet ashes or clinker will be replaced in order that the end of the pipe $c$ may always be sealed by the water in the tank.

I claim:—

1. In apparatus for removing material to be dumped into heaps from furnace installations, the combination with a discharge pipe for the material, of a tank containing water sealing the end of the discharge pipe, and rotary bladed conveyor means mounted in the tank for removing therefrom material discharged through said pipe.

2. In apparatus for removing material to be dumped into heaps from furnace installations, the combination, with a discharge pipe for the material, of a tank having a slanting bottom containing water sealing the end of the discharge pipe, and a blade wheel having a slanting axis mounted to rotate in the tank for removing therefrom material discharged through said pipe.

3. In apparatus for removing material to be dumped into heaps from furnace installations, the combination with a discharge pipe for the material, of a tank having a slanting bottom containing water sealing the end of the discharge pipe, and a blade wheel having a slanting axle journaled in the bottom of the tank for pushing up the slanting bottom and out of the tank the material discharged through said pipe.

In testimony whereof, I have signed my name to this specification in the presence of two witnesses.

GEORG SCHWABACH.

Witnesses:
 OTTO BRANDT,
 CARL CHAMPÉS.